April 18, 1961
B. WALKER
2,980,440
VARIABLE DISPLACEMENT HYDRAULIC SYSTEM WITH RESILIENT MEANS
FOR VARIABLE-VALUE AUXILIARY VEHICLE SUSPENSION
Filed Nov. 3, 1955
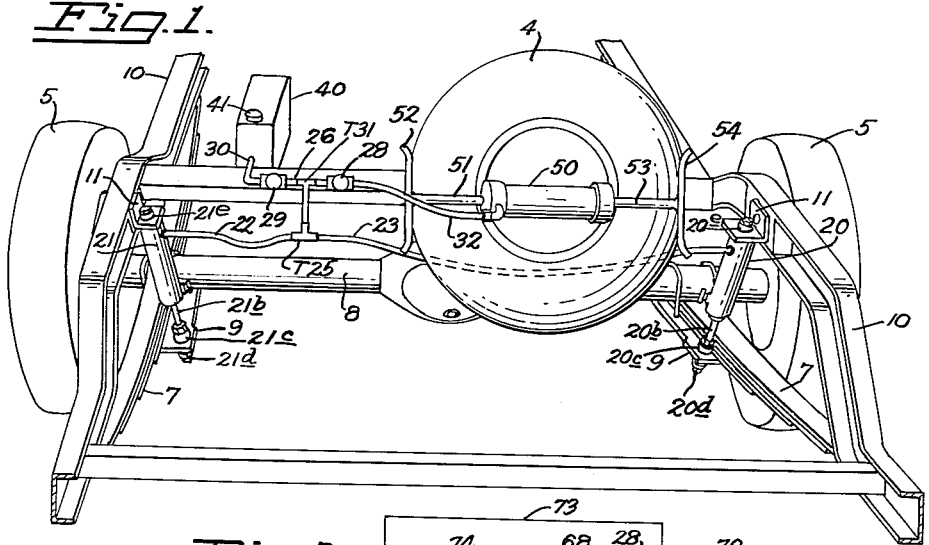
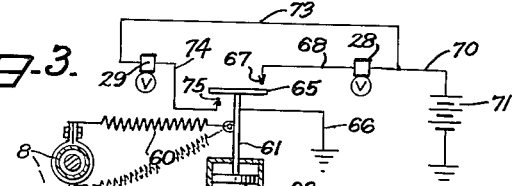
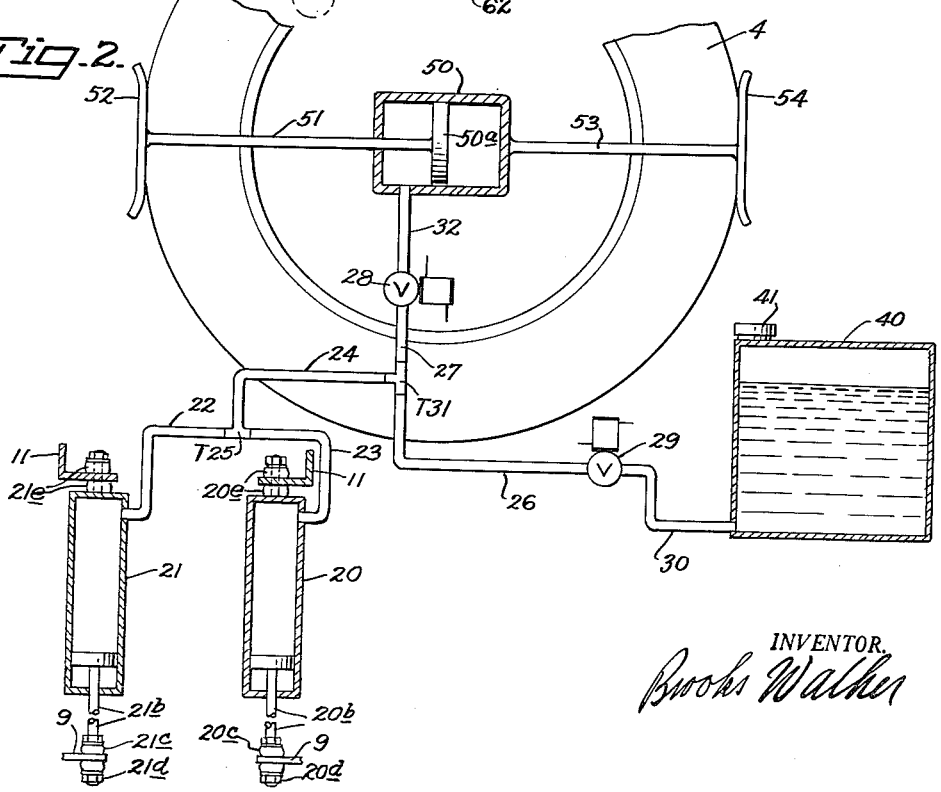
INVENTOR.
Brooks Walker

United States Patent Office

2,980,440
Patented Apr. 18, 1961

2,980,440

VARIABLE DISPLACEMENT HYDRAULIC SYSTEM WITH RESILIENT MEANS FOR VARIABLE-VALVE AUXILIARY VEHICLE SUSPENSION

Brooks Walker, 121 Scenic Ave., Piedmont, Calif.

Filed Nov. 3, 1955, Ser. No. 544,715

7 Claims. (Cl. 280—124)

The object of this invention is to provide auxiliary suspension for a motor vehicle or primary suspension for a motor vehicle in which the compressibility of the spare tire is utilized to give a yieldable support between the vehicle and the mechanism on which the vehicle wheels are supported.

Another object of this invention is to provide a first hydraulic cylinder between the structure on which the wheels operate and the vehicle body or frame and a second hydraulic cylinder connected through suitable linkage to the spare tire so that the movement of the second cylinder is restricted by the resistance of the spare tire to compression. The associated hydraulic cylinders and associated connections serve as the linkage between the resilient vehicle support and the spare tire compressing mechanism. The difference in the sizes of the cylinders effects any desired change in motion which may be desired between the wheel motion relative to the body and the spare tire compression. The motion of the structure on which the wheels move may be in the neighborhood of 8" whereas the compressibility of the spare tire may be held to 2" or 3" or a lesser amount on one side only of the spare tire.

Another object of the invention is that it is desirable to change the rate of vehicle suspension when different loads are carried in the vehicle and in order to accomplish this the hydraulic cylinders connected between the frame and the structure on which the wheels operate can be made to pump liquid from a reservoir into the hydraulic system between the cylinders which are connected between the body and structure on which the wheels rotate and the cylinder which compresses the spare tire to vary the amount of compression in the spare tire for a given axle to frame clearance.

Another object is to make the operation of this auxiliary vehicle support self-leveling as by electrically controlled valves controlling the pumping action.

Other objects of the invention will be more particularly pointed out in the accompanying specification and claims.

I have illustrated my invention by way of the following figures:

Fig. 1 is a perspective view of the rear portion of a vehicle incorporating one form of the invention.

Fig. 2 is a schematic view of a hydraulic circuit shown in Fig. 1.

Fig. 3 is a wiring diagram of a circuit that could control the electric valves of Figs. 1 and 2.

In all figures like numerals of reference refer to corresponding parts.

In Figs. 1 and 2 I have shown the rear portoin of a vehicle only to which the invention has been applied, in which the rear vehicle wheels 5 are supported on rear axle 8 on which they rotate, and axle 8 supports the vehicle frame 10 by leaf springs 7 which are suitable for supporting a light load on the vehicle. Hydraulic cylinders 21 and 20 are located at the left and right rear respectively as viewed in Figs. 1 and 2. The top ends of the cylinders are secured to frame brackets 11 by suitable nuts and rubber-like washers 21e and 20e respectively, similar to the mountings used on conventional bolt and shock absorbers. Piston rods 21b and 20b are secured respectively to bracket 9 which is secured to the bottom of the springs 7 by the usual U-bolts passing over the axle 8. The method of securing is similar to a bolt end shock absorber and has rubber-like washers 21c on both sides of bracket 9 and a suitable nut and washer 21d securing the piston rod 21b to bracket 9. In a similar manner, rubber-like washers 20c and nut 20d secure piston rod 20b to right hand bracket 9, as viewed in Fig. 1. Spare tire 4 is shown placed directly behind the rear axle though it could have been placed in the conventional position near the right hand side member of frame 10 or any other desired position. A hydraulic connection to cylinder 50 may be flexible and extend to any usual position where the spare may be carried to the best advantage. Cylinder 50 is connected through cylinder extension 53 to shoe 54 at the right hand side of the spare, as shown in Fig. 1. Piston rod 51 is connected to shoe 52 which engages the left hand outer diameter of the spare, as viewed in Fig. 1. Cylinders 21 and 20 are connected together through lines 22, 23, and T25. T25 is connected through line 24 to T31. T31 is connected to the reservoir 40 through line 26, solenoid-operated check valve 29, and line 30. Reservoir 40 has filler cap 41. T31 is connected with line 27, solenoid-operated valve 28, line 32, and onto the left hand side of piston 50a in cylinder 50. When it is desired to increase the support through cylinders 21 and 22 which are pivoted to body frame 10 and axle 8; solenoid-operated check valves 28 and 29 are actuated so that these valves become automatic check valves. As the axle 8 moves up and down cylinders 21 and 20 become pumps. On the down stroke of axle 8 relative to body frame 10 liquid is drawn from reservoir 40 through line 30, check valve 29, through line 26 and associated lines into the upper half of cylinders 21 and 20. As axle 8 moves towards the frame, fluid cannot flow back into reservoir 40 due to check valve 29 and therefore moves past check valve 28 to the left hand side of piston 50a and cylinder 50 to compress shoe 52 towards shoe 54 and obtain greater oil pressure in the system. This greater oil pressure in the system acting on the top half of cylinders 21 and 20 tends to raise the vehicle frame 10 relative to axle 8. After this is raised to a sufficient height, valve 29 remains a one-way check valve preventing flow of fluid into reservoir 40 and valve 28, which is de-energized, is open so that it is a free-flow valve with no check valve characteristics. The motion of axle 8 is then transmitted hydraulically to piston 50a and as axle 8 moves up shoes 52 and 54 move toward each other developing greater resistance, oil pressure, and greater vehicle support. The degree of compressibility of the spare tire 4 depends on the amount of fluid in the top half of cylinders 21 and 20, the associated connecting pipes and the left hand side of piston 50a in cylinder 50.

When it is desired to reduce the amount of overload carried on cylinders 21 and 20, solenoid valve 29 is open momentarily to allow some of the fluid between cylinders 21 and 20 and the left hand side of piston 50a and cylinder 50 to flow back into the reservoir 40 until the desired amount of support is provided through cylinders 21 and 20. The liquid change in the system for varying the amount of overload, as just explained, could be supplied in an axle-driven separate pump reservoir and automatic control valve, such as shown in my co-pending application, Ser. No. 459,441, now U.S. Patent 2,912,235, or a manual foot pump, such as is shown in my co-pending application, Ser. No. 394,244, now U.S. Patent 2,892,636, could also be used to add or subtract fluid from a reservoir to a circuit between the overload cylinders 20 and 21 and the spare tire compressing cylinder 50. However, the system as shown in this invention is unique in that the hydraulic cylinders that add to the support of the vehicle frame relative to the structure on which the wheels rotate, namely axle 8 in this illustration, can be varied by using the same cylinders as pumps to draw liquid into the system from a reservoir carried on the vehicle. This offers a very fast change in the overload characteristic and offers a great economy of construction over those which would require a manual or automatic pump.

In Fig. 3 I have shown an automatic leveling switch for operating the solenoid-operated valves 28 and 29. In order that the auxiliary suspension have such self-leveling characteristics the solenoid valves 28 and 29 could be actuated by an automatic control switch, such as is shown in Fig. 3, wherein the motion of axle 8 is transmitted to spring arm 60. Axle 8 is connected through coil spring arm 60 to piston rod 61 and dash pot 62 which carries dampening piston 63 in a bath of liquid in cylinder 62. A switch plate 65 is connected to ground through wire 66. Contact 67 is connected through wire 68 to one side of the winding of valve 28. The other side of the winding of valve 28 is connected to battery 71 through wire 70. Solenoid coil of valve 29 is connected on one side to battery through lines 73 and 70 and on the other side to contact 75 located on the lower side of switch plate 65 by wire 74. As more load is put into the vehicle, axle 8 moves towards the vehicle frame which supports dash pot cylinder 62 and piston rod 61 is urged upward by spring 60 which is stiff enough to move piston 63 when axle 8 maintains an average sustained position closer to frame 10 than when the vehicle is unloaded. Spring arm 60 and dash pot 62 allow motion of axle 8 encountering all kinds of rough roads to take place without moving piston 63 appreciably in following the individual bumps, but allows switch plate 65 to follow only the average position changes of axle 8 relative to the frame as when the vehicle load is changed. As a load is put in the car, spring 60 urges piston 63 upwards so that the switch plate 65 contacts switch point 67 and valve 28 is energized by current flowing from battery 71 through line 70 to a coil in solenoid valve 28 through wire 68, point 67, switch plate 65, wire 66, and on to ground. Solenoid valve 29 acts as a check valve and lets liquid flow from reservoir 40 to supporting cylinders 21 and 20 acting as pumps, through the associated lines through energized check valve 28 and into the left side of cylinder 50 to increase the amount of overload auxiliary support by cylinders 20 and 21. When the vehicle has a load removed the spring 60 moves piston rod 61 downwards against the resistance of piston 63 and dash pot 62 so that valve 29 is energized by a current flowing from battery 71 through line 70, line 73 through solenoid valve 29, line 74, point 75, switch plate 65, wire 66 to ground. This changes valve 29 from a check valve (allowing flow from reservoir 40 only) to an open valve allowing fluid to flow back into reservoir 40 from the left hand side of piston 50a in cylinder 50 and the upper portions of cylinders 20 and 21. At the same time the resistance in built-up hydraulic pressure in the top side of auxiliary supporting cylinders 21 and 20 is reduced causing the vehicle to lower. When the vehicle has reached a sufficient axle to frame level, spring 60 pushes piston rod 61 up so that valve 29 again returns to a check valve with no more flow toward the reservoir 40. In this check valve position of valve 29, there will always be pressure in the system between lines 20 and 21 and the left hand side of piston 50a in cylinder 50 due to the resistance to the compressing of the spare tire and therefore check solenoid valve 29 will not be opened and no oil will flow from the reservoir into the circuit. As more load gets out of the vehicle or is removed, spring 60 will move the piston rod 61 downward again against the resistance of piston 63 and dash pot cylinder 62, until switch plate 65 contacts point 75 which energizes solenoid valve 29 by current flow from battery 71, through line 70, line 73, past a coil in the solenoid valve 29, line 74, point 75, switch plate 65, wire 66, and to ground. This energizing of valve 29 causes it to open and allows more vehicle liquid to flow back into reservoir 40 until the switch plate 60 floats is lowered to the point where switch plate 60 floats between contact 67 and contact 75. As an average position of the vehicle, which average is maintained by dash pot piston 63 and dash pot 62, etc. The size of cylinders 20 and 21 relative to the size of cylinders 50 determines the ratio of motion of axle 8 relative to the compression of the spare 4 between shoes 52 and arm 51. For example, axle 8 might move 8" for a 4" motion of shoe 52 relative to shoe 54, etc.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and not intended to be in any sense limiting.

I claim as my invention:

1. A vehicle having ground-supporting wheels, a frame, a structure on which said wheels rotate, a supporting hydraulic cylinder connected between said structure and said frame, a second hydraulic cylinder, a hydraulic system connecting said cylinders, a spare tire, said second hydraulic cylinder connected to said spare tire, a shoe pressing against the said spare tire, said shoe connected to said second cylinder, the motion of said structure on which said wheels rotate supporting said frame partially through the resistance to compressing of said spare tire as transmitted to said structure by means of said cylinders, valve means in said hydraulic circuit whereby said supporting cylinder can act as a pump to increase the fluid in said circuit to increase the auxiliary support provided by said hydraulic circuit.

2. A vehicle having ground-supporting wheels, a frame, a structure on which said wheels rotate, a supporting hydraulic cylinder connected between said structure and said frame, a second hydraulic cylinder, a hydraulic system connecting said cylinders, a spare tire, said second hydraulic cylinder connected to said spare tire, a shoe pressing against the said spare tire, said shoe connected to said second cylinder, the motion of said structure on which said wheels rotate supporting said frame partially through the resistance to compressing of said spare tire as transmitted to said structure by means of said cylinders, valve means in said hydraulic circuit whereby said supporting cylinder can act as a pump to increase the fluid in said circuit to increase the auxiliary support provided by said hydraulic circuit, an automatic level control mechanism, a reservoir, said mechanism operating in conjunction with a dash pot to control the valving in said hydraulic circuit so that more fluid is added to said hydraulic system between said spare tire compressing means and said supporting cylinder which acts between the said supporting structure and said frame as more load is carried in the vehicle and releasing fluid from said hydraulic system to said reservoir when part of the load carried by said vehicle is removed.

3. The vehicle of claim 2, in which said hydraulic means compresses said spare tire acting on the opposite sides of said tire and exerting substantially equal forces on said opposite sides.

4. In a vehicle suspension system wherein the vehicle frame is resiliently supported on the road wheel supports, frame support means comprising a pair of hydraulic cylinder units connected to and extending between the frame and said wheel supports so that on extension of said units the frame is raised relative to the wheel supports and on contraction of the units the frame is lowered relative to the wheel supports, first passage means connecting said units so that fluid under pressure supplied to the units through the passage means is operable to extend the units, second fluid passage means connected to said first passage means, yieldable means for exerting a pressure on the fluid in said second passage means, a valve in said second passage means between said first passage means and said yieldable means, a fluid reservoir, third passage means connecting said reservoir and said first and second passage means at a position between said valve and said cylinders, and valve means in said third passage means, whereby when said valve is closed to flow of fluid from said yieldable means, and said valve means is openable to one-way flow in a direction from said reservoir toward said first and second passage means, fluid from said reservoir is drawn into said units on extension of the units caused by relative movement of said frame and said road wheel supports, and when said valve is open to two-way flow said yieldable means maintains a pressure on the fluid in the units so that contraction of the units is resisted by the fluid therein.

5. A vehicle having ground-supporting wheels, a structure on which said wheels rotate, a frame, first supporting hydraulic cylinder and piston means connected between said structure and said frame, a second hydraulic cylinder connected by a hydraulic system to said first cylinder and having a piston, a spare tire, a pair of shoes pressing against opposite sides of said spare tire, one said shoe being connected to said second cylinder and one to the piston thereof so that the motion of said structure on which said wheels rotate is partially resisted by the resistance to compression of said spare tire as transmitted to said structure by means of said first and second cylinders, and means including a valve and a fluid reservoir means for said hydraulic system providing for operation of said first cylinder and piston means as a pump to increase the fluid in said system to increase the auxiliary support.

6. A vehicle having supporting wheels, a frame, resilient means interposed between said frame and said wheels and including a fluid support system having a variable displacement container, an actuator, conduit means connecting said container to said actuator, and fluid in said conduit means and said container and in contact with said actuator, yieldable resistance means external to said system and engaged with said actuator to give resilience to the support by said system, a storage tank for fluid, means including a two-position valve connecting said tank to said conduit means and operable in a first valve position to provide for a one-way fluid communication of said tank and said conduit means permitting fluid flow only in a direction from the tank to the conduit means and operable in a second valve position to permit flow in both directions between said tank and said conduit means, so that in said first position vertical movement of said wheels relative to said frame causes said container to act as a pump to withdraw fluid from said tank and increase the amount of fluid in said system, and the fluid in said container under pressure from said external resistance means provides resilient support for said frame, and control means for said valve means.

7. The vehicle of claim 6 wherein there is a second valve means in said system in said conduit means and second control means therefor, so that when said two position valve is in said second position and said second valve means is open said container is operable to force fluid therefrom into said tank to decrease the amount of fluid in said system.

References Cited in the file of this patent
UNITED STATES PATENTS

| | | |
|---|---|---|
| 1,642,946 | Fay | Sept. 20, 1927 |
| 2,249,402 | Stefano | July 15, 1941 |
| 2,323,204 | Cross | June 29, 1943 |
| 2,452,105 | Cosentino | Oct. 26, 1948 |
| 2,592,391 | Butterfield | Apr. 8, 1952 |
| 2,687,311 | Nallinger | Aug. 24, 1954 |
| 2,755,099 | Smith | July 17, 1956 |
| 2,825,579 | Heiss | Mar. 4, 1958 |

FOREIGN PATENTS

| | | |
|---|---|---|
| 1,079,671 | France | May 19, 1954 |